Aug. 12, 1969   N. E. WELTER   3,461,452
TIME DELAY MEASUREMENTS
Filed Oct. 24, 1966

INVENTOR.
Neil E. Welter
BY
Mueller, Aichele & Rauner
ATTY'S.

щ
3,461,452
TIME DELAY MEASUREMENTS
Neil E. Welter, Scotsdale, Ariz., assignor to Motorola, Inc., Franklin Park, Ill., a corporation of Illinois
Filed Oct. 24, 1966, Ser. No. 588,977
Int. Cl. G01s 9/04, 9/12
U.S. Cl. 343—12                                                    3 Claims

ABSTRACT OF THE DISCLOSURE

A time delay measurement system wherein a local signal generator is operated at the same frequency as the incoming modulation and the replica signal to supply IF of the incoming modulation. A signal mixer receives the incoming modulation and the replica signal to supply IF signal of varying amplitude indicative of the time delay difference between the locally generated replica signal and the received modulation. When the two signals are in time coincidence the IF signal has zero amplitude.

---

The invention described herein was made in the performance of work under a NASA contract and is subject to the provisions of Sec. 305 of the National Aeronautics and Space Act of 1958, Public Law 85-568 (72 Stat. 435; 42 USC 2457).

This invention relates to the measurement of signal time delays, such as in range measurement systems, and more particularly to receivers and demodulation methods for use in measurements of signal propagation delays which reduce measurement variations in such systems as may be caused by environmental generated equipment instabilities.

A range measurement system typically may include a transmitter and a receiver located at a ground station and a transponder in an airborne station, such as an aircraft or a missile. The transmitter emits radio signals by a pseudo-noise code or other form of modulation. The transponder after receiving the emitted signal returns it to the ground station receiver. The ground station automatically adjusts a receiver controlled oscillator to determine the time lag or time delay introduced into the modulation components caused by the propagation time between the two stations, thereby indicating range or distance between the two stations. Typically, the ground station transmitter supplies a reference signal to a range measurement device. The receiver in turn sends its controlled oscillator signal as adjusted by the received signal to the same range measurement device which then compares the two signals and indicates the propagation delay; i.e., the time difference between the reference signal and the receiver generated signal. Such time delays include delays in the electronic equipment in addition to propagation time, which when known are compensated for.

A prior art range measurement receiver usable in the above-described system has included an input radio frequency section for suitably amplifying and manipulating a received signal from the transponder. Such a receiver usually includes a carrier frequency phase-lock loop for accurately causing the receiver to frequency track the carrier frequency omitted by the transponder. Such a phase-lock loop operates with the first mixer and is usually adjusted to have a frequency equal to the sum or difference of the received carrier frequency and an intermediate carrier frequency used locally in the receiver. In addition modulation signals are generated in the receiver; such signals are designed to match modulation signals used by the ground station transmitter, and then mixed with the local oscillator signal in such a way to produce an intermediate frequency (IF) carrier frequency signal. Such local modulation in a pseudo-noise modulation scheme is usually at one-half the clock or pulse repetitive frequency of the received modulation. Such an IF signal is modulated by the time difference between the received and a locally generated modulation signal. In known prior art receivers, such intermediate frequency modulation information is carried as a phase or frequency modulation in the intermediate carrier frequency signal. For a given range such phase modulation is a constant phase. Since the measurement concerns time differences, any time delays in the intermediate frequency section of the receiver will be added to the range or propagation time being measured. Normally this is compensated for in the range measuring device. However, receivers are subjected to various environmental conditions which cause instabilities in the delay of signal processing through such types of equipments. Such instabilities introduce unpredictable errors into the resultant measurements.

Signal processing prior art range measurement receivers included on IF section suitably amplying the output signal from the mixer and then supplies such amplified signal to a second mixer. Such second mixer may receive the intermediate carrier frequency from the above-mentioned carrier frequency phase-lock loop. The output signal of the second mixer is the phase modulating signal carried by the IF carrier frequency. A second intermediate frequency portion, or sharply tuned filter, is tuned to the modulation frequency of the received modulation components for passing the received and reproduced phase modulating signals to a phase detector. Such phase detector is connected to a voltage controlled oscillator which supplies its signals to a frequency divider and thence to a 90° phase shifter for feeding back such signals to the phase detector for phase detecting incoming modulated signals. Such voltage controlled oscillator also is connected to a modulation signal generator, such as a pseudo-noise generator or tone generator, for adjusting the time of modulation toward time coincidence with the received modulation components on the incoming carrier signal. Such time differences are treated as phase differences. When the locally generated modulation signals are in time coincidence with the incoming modulation components, range detection is indicated.

The output signal of the phase detector indicates the time difference in the locally generated signals and incoming modulation components. The VCO or voltage controlled oscillator serves to integrate these changes and provides in its output signal an integrated indication of range measurement. The range measurement device receives such signals and compares them with the time of transmission of the transimtted signals. The difference of course indicates range in terms of propogation and equipment delays of the modulating signal.

It is therefore seen that in such systems the time delays caused by the IF sections and other sections of the receiver may vary in temperature or other environmental conditions may introduce uncontrolled phase variations in the demodulated signal, thereby introducing range inaccuracies which are unpredictable. In systems wherein range is measured accurately, such uncontrolled range measurement variations should be minimized.

Accordingly, it is an object of the present invention to provide an improved range or propagation time measurement system and receiver.

It is another object of this invention to provide a range measurement receiver which introduces fewer untrolled environmental caused phase errors in a range measurement receiver.

It is still another object of this invention to provide a signal delay measurement system wherein the measurement receiver manipulates the modulation components of a phase modulated system as amplitude modulation components.

A feature of the present invention which obviates environmental changes from altering time delays within a measurement receiver includes the demodulation of a propagation delayed incoming and modulated signal such that any and all modulation components indicating time delays are converted to an amplitude modulation component and then processed by such receiver. An amplitude detector in the receiver detects the amplitude modulation component for controlling a controlled oscillator which supplies its signal to a demodulating portion of the receiver.

Range measurement systems often utilize the known pseudo-noise coding system for accurately indicating range, especially where multi-path transmissions are found. A feature of this invention includes demodulation at a clock frequency of the incoming modulation. A phase detector is operated at such clock frequency rather than at one-half clock frequency as is conventional in phase detection systems.

Another feature of the invention is that the time difference between received modulation and locally generated modulation which indicates range is converted to an amplitude modulation component at the first mixing stage of a range measurement receiver.

Referring now to the accompanying drawing wherein.

Figure 1:
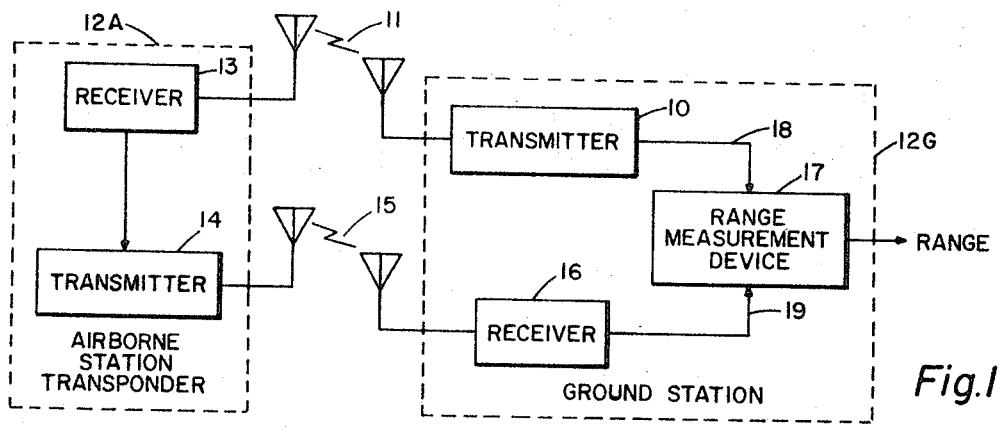
FIG. 1 is a block diagram of a range measurement system in which the present invention may be used.

A receiver embodying the subject invention is usually characterized in that it has a radio frequency or RF section for receiving and amplifying the modulated incoming carrier signal, a carrier frequency phase-lock loop keeping the receiver oscillator locked onto the carrier frequency, such phase-lock loop supplies its signal to a first mixer which demodulates the incoming carrier frequency signal such that the time difference between modulation on the received wave and a locally generated wave are converted into an amplitude modulation component. Certain modulation components may be selectively introduced into the locally generated demodulating signal and in the first mixer to heterodyne with the incoming carrier signal such as to produce said amplitude modulation component. Such an amplitude modulation component is usually carried on an IF signal.

When the received signal and the locally generated signal have modulation components occuring in time coincidence, the first mixer supplies no amplitude modulation component on the intermediate frequency carrier signal. This null of modulation means that the demodulation and tracking detection operates around a null therefore can be adjusted to be very accurate. When the received or incoming modulation signal is lagging, that is, occurs after the modulation components of the locally generated signal, an amplitude signal of a first sign or direction is supplied from the first mixer; while when the incoming or received signal is leading in time the locally generated modulation signal, the amplitude modulation supplied by the first mixer has the opposite sign. It should be noted that the delays in the IF section do not alter the amplitude modulation component of the intermediate frequency carrier. Therefore, any delays merely effect the carrier and not the modulation component, as opposed to the known prior art techniques.

The IF section supplies its amplified amplitude modulated signal to a phase detector which receives its other input from an intermediate frequency (IF) oscillator operating at the center intermediate carrier frequency, such that the two carrier frequencies have in-phase components. This relationship means the phase detector actually operates as a coherent amplitude modulation detector. It is termed a coherent amplitude modulation detector because the two signals, i.e., the intemediate frequency carrier and the locally generated demodulating signal from the IF oscillator are usually kept substantially in phase as by deriving both signals from the same source. The phase detector supplies its signal to the controlled oscillator for adjusting its phase of operation until the incoming signal modulation components are in time coincidence with the locally generated modulation as detected in the first mixer. The coherent amplitude detector drives a controlled oscillator which in turn supplies its output signal to a range measurement device wherein its signal is compared with a modulation reference signal supplied by the transmitter for detecting range. It should be noted that the controlled oscillator acts as an integrator for integrating the changes indicated by the coherent amplitude detector and therefore supplies signals indicative of true range or maximum time difference between the two modulations.

The modulation introduced into the locally generated demodulating signal supplied to the first mixer can be generated by a tone or code generator which is driven by the controlled oscillator signal, or by the oscillator output signal.

Referring now to FIG. 1 there is shown in block diagram form a typical range measurement system. A transmitter 10 of known design emits modulated signals as indicated by line 11. In some systems this modulation may be a pseudo-noise code for eliminating multi-path communications between an airborne transponder 12A and a ground station 12G including transmitter 10. Such communication techniques are described by R. Price and P. E. Green, Jr. in an article entitled "A Communication Technique for Multipath Channels," beginning on page 555 of the March 1958 issue of the Proceedings of the IRE, volume No. 46. This article shows the generation of a pseudonoise code having a correlation factor of two, such as in FIG. 4, found on page 559 of the identified article. Such a pseudo-noise generator may be used in the receiver of the subject invention.

Returning now to FIG. 1 transponder 12A includes receiver 13 which receives the transmitter 10 modulated radio signal. It in turn supplies corresponding control signals to the transponder transmitter 14 which returns a replica of the received signal to the ground station receiver 16 as indicated by line 15. The propagation time of signals between stations 12A and 12G; i.e., between transmitter 10 and receiver 13 added to the time of transmission between transmitter 14 and receiver 16 plus the known delays in the various electronic components (as may be subtracted from the delayed signal as received by receiver 16) is a true indication of range or distance between stations. The elapsed time actually will indicate twice the range, therefore, if it is divided by two a true range based upon radio transmission is determined as by a known range measurement device 17. The transmitter 10 supplies synchronization signals over line 18 to measurement device 17 while receiver 16 supplies its VCO signals over line 19 for comparison with the transmitter synchronization signals to determine elapsed time between transmission and reception. The present invention concerns the demodulation and comparison of a received signal to determine elapsed propagation time.

To more clearly point out the invention a prior art receiver will first be described with particular reference to the block diagram of FIG. 2. The transponder supplied radio signal having a modulated carrier signal is received or intercepted by antenna 20 and supplied to the usual radio frequency section 21 wherein the received signal is suitably amplified. Usually, range measurement systems operate at extremely high frequencies therefore the typical range measurement receiver wil have a carrier frequency phase-lock loop 22 keeping the receiver locally generated signal frequency equal to the incoming carrier signal frequency. RF section 21 supplies the received carrier signal over line 23 to the phase-lock loop 22. An intermediate frequency signal generator 24 supplies an intermediate frequency signal over line 25 to the carrier frequency phase-lock loop 22 wherein it is either added or subtracted to the received carrier frequency and then supplied to mixer 26 which receives modulation components identical or otherwise related to the modulation components on the received signal from tone or code generator 27. Mixer 26 supplies the phase-modulated locally-generated signal equal to the sum or difference of the carrier frequency and the intermediate frequency over line 28 to first mixer 29. Mixer 29 then subtracts the received signal from section 21 and the locally generated signal on line 28 to supply intermediate frequency carrier signal over line 30 which carries the elapsed time indication as a phase component of the intermediate frequency carrier signal hereinafter more fully explained. IF section 31 then amplifies the line 30 signal.

IF section 31 acts as a filter and usually has several stages of electronic amplification. Such electronic amplification has been found to be susceptible to environmental changes and therefore may introduce various time delays in the processing of signals therethrough. Therefore, delays introduced further increases the received signal delay to introduce uncontrolled elapsed time caused range errors in the signal. In some range measurement systems this may be tolerable while in accurate systems this introduces serious errors The IF section 31 supplies its amplified signal over line 32 to second mixer 33 which receives the intermediate frequency carrier over line 34 from generator 24. Mixer 33 subtracts the intermediate frequency carrier from that supplied by section 31 to in turn supply the modulation signals over line 35 to a second IF section 36. IF section 36 acts as a filter and is tuned to the expected frequency of the modulation carried by the intercepted signal. The filtered modulation signals are supplied over line 37 to phase detector 38 where they are phase detected to supply a DC signal over line 39 to voltage controlled oscillator 40 for adjusting its operation such that the time difference between the modulation components supplied by generator 27 and the received modulation is zero. Such DC signal indicates the instantaneous time difference between the received signal modulation components and the receiver generated modulation components. VCO 40 supplies its signals over line 41 to a frequency divider 42 which divides the frequency by two. Divider 42 supplies frequency-divided signals to phase shifter 43 which in turn drives phase detector 38 in a well known manner. VCO 40 signals on line 41 are also supplied to a range measurement device 44. The frequency-divided signals are also supplied over line 45 to generator 27 for adjusting its operation to supply modulation signals in time coincidence with the received and detected modulation signals.

Figure 2:
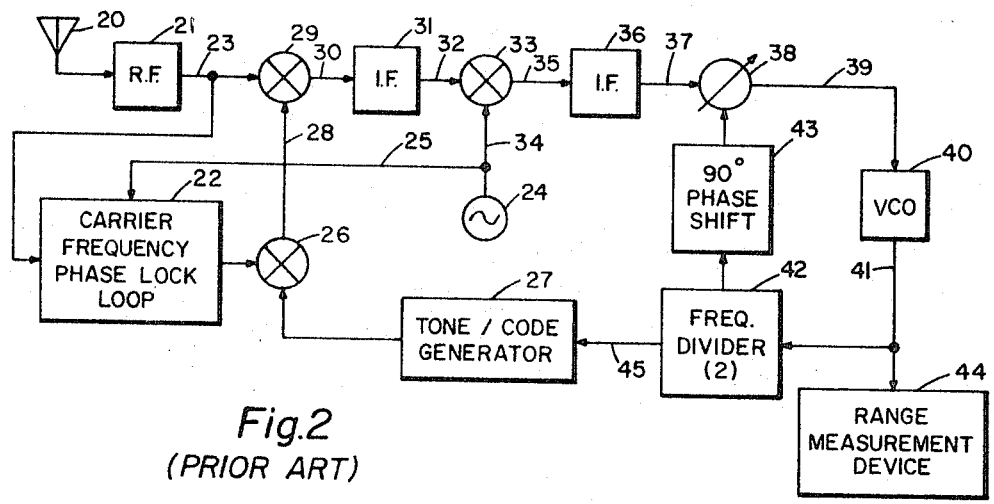
FIG. 2 is a block diagram of a range measurement receiver constructed according to known prior art techniques.

Summarizing the FIG. 2 receiver, the received signal as intercepted by antenna 20 maintains its delayed modulation characteristics through RF section 21, mixer 29, IF section 31, mixer 33 and IF section 36 until phase detected by detector 38. Therefore any environmental changes causing differences of signal processing times introduce errors into the range measurement detected by measurement device 44.

The operation of the prior art receiver illustrated in FIG. 2 will be further explained with respect to a single tone type of modulation rather than a pseudo-noise (PN) type of modulation to describe how the IF section 31 carries the elapsed or propagation time delay as a phase component of the IF signal. It is to be understood that the single tone presentation is an extremely simplified version of the pseudo-noise case, however, the statements made are applicable to the PN type of modulation. To illustrate the pseudo-noise case requires a very extensive and rigorous mathematical approach which would tend to obscure the true invention.

As used herein the equations are numbered according to the lines or apparatus in which the represented signal is found. For example, Equation 23 represents the input or received signal found on line 23 of FIG. 2. The same approach will be followed in describing the signals of a single tone operation of the FIG. 3 apparatus, the following nomenclature is used in both FIGS. 2 and 3:

$B$—modulation single tone expressed in radians per second
$w$—carrier frequency in radians per second
$w'$—the intermediate carrier frequency in radians per second
$t$—time in seconds
$\theta$—elapsed or propagation time represented as a phase shift of the modulation components The transponder emitted signal intercepted by antenna 20 and amplified by section 21 is represented by:

$$\cos Bt \cos wt \qquad (23)$$

wherein $\cos Bt$ represents the modulation signal and $\cos wt$ represents the carrier signal.

The demodulating or locally generated signal is:

$$2 \cos (Bt/2+\theta) \cos (w+w') \qquad (28)$$

It should be noted that the mixer 26 receives the carrier plus the IF frequency from phase-lock loop 22 and the modulation component directly from frequency divider 42. In this illustration generator 27 can be ignored. The time lag term $\theta$ is added to the locally generated modulation signal $Bt/2$ to show that the received signal is lagging a locally generated signal by the phase amount $\theta$.

Mixer 29 receives the signals represented by Equations 23 and 28 and passes them to line 30. For purposes of discussion it is assumed that mixer 29 has certain pass band and will pass the following mixed signal to line following mixed signal:

$$\cos (Bt/2+\theta) \cos Bt \cos w't \qquad (30)$$

The above represented signal actually consists of two closely related signals of which the second portion is filtered out by IF section 31, that is, the signal is $$\tfrac{1}{2} \cos (Bt/2-\theta) \cos w't + \tfrac{1}{2} \cos (3Bt/2+\theta) \cos w't \qquad (30')$$

wherein the second term is filtered out by section 31.

Mixer 33 receives the first term of Equation 30' plus:

$$4 \cos w't \qquad (34)$$

Mixer 33 mixes the signals 34 and first term of 30' to supply the following signal:

$$\cos (Bt/2-\theta) \qquad (35)$$

In all of the above equations it should be noted that the time lag indication $\theta$ is carried in the IF signal expressed in Equations 30, 30' and in 35 as a phase component of the locally generated modulating signal. Therefore, any additional time delays given to the modulation signal as by IF section 31 or IF section 36 will be added to the component $\theta$ introducing errors.

The mixer output signal 35 is supplied to phase detector 38 wherein it is mixed with the phase shifted VCO signal:

$$2 \sin Bt/2 \qquad (43)$$

to supply a DC signal:

$$\sin \theta \qquad (39)$$

Sine $\theta$ is a DC signal indicative of the instantaneous time difference between the modulation components of the received signal on antenna 20 and the VCO signal as frequency divided by divider 42 and supplied over line 45 to mixer 26. It is to be noted that the first DC signal indicative of the time lag between the received signal and the locally generated signal is supplied on line 39 as an output signal of phase detector 38.

Figure 3:
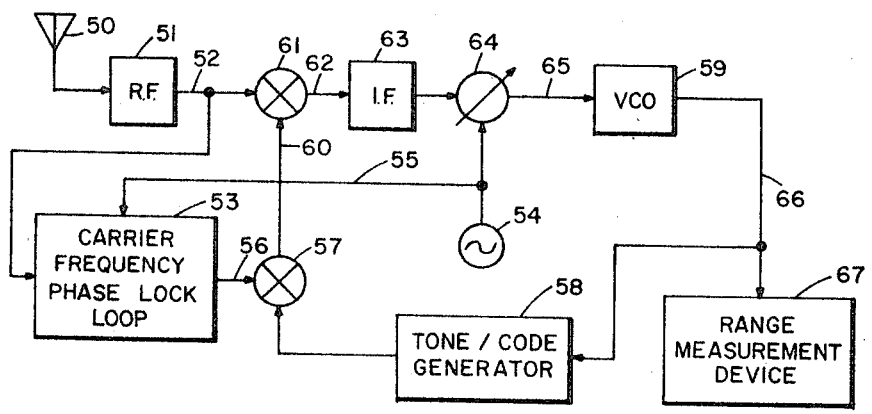
FIG. 3 is a block diagram of a range measurement receiver embodying the present invention.

Referring now to FIG. 3 there is shown in block diagram form a range measurement receiver embodying the teachings of the present invention. The transponder emitted carrier frequency signal as modulated by the transmitted modulation signals is intercepted by antenna 50 from whence it is passed to RF section 51. Section 51 supplies the amplified carrier frequency signal over line 52 to a carrier frequency phase-lock loop 53, known in the art; loop 53 receives an intermediate frequency signal from generator 54 over line 55 where it is combined with the locally generated carrier frequency and supplied over line 56 to mixer 57. Mixer 57 receives a tone, pseudo-noise code or other modulation from generator 58 as driven by voltage controlled oscillator 59. Generator 58 produces the same type of modulation as that generated in transmitter 10 (FIG. 1). Mixer 57 supplies its mixed signals, i.e., modulated locally-generated signals, over line 60 to first mixer 61. Mixer 61 also receives intercepted signals over line 52 and mixes it with the modulated locally-generated signals. Mixer 61 mixes the two signals and supplies an amplitude-modulated intermediate frequency carrier signal over line 62 to IF section 63.

The term "amplitude modulated" is used in its broad sense in that the IF signal has an amplitude and sign indicative of any time difference of received modulation and locally generated modulation; for a given time difference the IF signal is a constant amplitude; for zero time difference there is an absence of IF signal.

Section 63 supplies its output signal to a phase detector 64. It is intended that the phase detector 64 may be constructed as any known phase detector, however, it should be noted that the phase detector apparatus is not operated in its usual manner in that the phase detecting signal is not 90° phase shifted from the signal to be detected; rather the line 55 signal is in phase with the IF carrier signal since the generator 54 supplies the line 55 signal as well as modulates the locally generated demoduated signal formed in phase-lock loop 53. The small phase shifts that may be introduced to the demodulating signal on line 56 by components 57, 61 and 63 should be quite small making the IF signal supplied to coherent amplitude detector 64 substantially in phase with the generator 54 signal. When the IF carrier signal from section 63 has no amplitude a first DC signal supplied to generator VCO 59 while when it has a certain amplitude of a given time other DC signals are supplied to VCO 59 for adjusting its operation back to the point of no IF carrier signal amplitude. As described, the phase detector 38 does not operate as a true phase detector, rather it operates as a "coherent amplitude detector." That is, IF generator 54 tuned to the center frequency of IF section 63 supplies its signal to phase detector 64 as well as to loop 53 to form the demodulating signal for mixer 61. Section 63 supplies a sharply-filtered narrow-band signal having the amplitude modulation component thereon which represents the time difference between the incoming modulation and the locally generated modulation to detector 64. If the two signals are the same, that is, IF section 63 signal has no amplitude (indicating the receiver has locked onto the range) then detector 64 supplies no change in signal over line 65 to voltage controlled oscillator 59. Detector 64 may have an integrating filter in its output section to provide a relatively constant DC voltage over line 65 to accurately and stably control oscillator 59 operation. VCO 59 in turn supplies its output signal over line 66 to a range measurement device 67.

Operation of the FIG. 3 embodiment of the present invention will now be described with respect to a single tone instead of a pseudo-noise code modulation in the same manner as was described for the FIG. 2 illustration of a prior art receiver. In the same manner the below numbered equations correspond to the lines or apparatus in which the represented signal will be found in the receiver. For simplifying the presentation, tone or code generator 58 may consist of a 90° phase-shifting network.

The intercepted signal on line 52 is the same as Equation 23 and is:

$$\cos Bt \cos wt \qquad (52)$$

The demodulating locally generating signal is:

$$2 \sin (Bt+\theta) \cos (w+w')t \qquad (60)$$

It should be noted that this signal is different from the signal on line 28 as expressed in the Equation 28 in that the modulation signal on the locally generated carrier is equal to the modulation frequency rather than one-half the modulation frequency as in Equation 28.

Mixer 61 receives the signals expressed in Equations 52 and 60 and supplies on line 62 the following signal:

$$\sin \theta \cos w't \qquad (62)$$

It should be noted that the time difference between the received modulation components and the locally generated components expressed by the symbol $\theta$ is now carried as DC component "sin $\theta$" times the intermediate frequency signal cos $w't$. In this equation it can be seen that when $\theta$ is equal to 0, that is, there is no time difference between the two modulation signals, the intermediate frequency signal amplitude will also be 0 or a null. When $\theta$ is positive, that is, the received signal modulation components lag those of the locally generated components, the sign will be positive providing a positive amplitude. Correspondingly, when $\theta$ is negative, a negative amplitude is provided.

Generator 54 provides the demodulating signal to the coherent amplitude detector 64 as:

$$2 \cos w't \qquad (55)$$

The numeral 2 is used for simplification of equations. The coherent amplitude detector takes the signal represented by Equation 62 mixes it with Equation 55 signal resulting in an output signal equal to:

$$\sin \theta \qquad (65)$$

It should be noted that the output of the first mixer 61 contains the DC component indicating time difference, therefore any equipment variations caused by environmental conditions, for example, will not effect the DC amplitude, therefore making this receiver insensitive to variable time delays within the electronic components thereof.

What is claimed is:

1. A receiver circuit for a ranging system employing a modulation coding having a clock frequency modulating a carrier frequency signal, including in combination,
    a controlled oscillator operating at the clock frequency,
    local signal generating means including means automatically adjusting to said carrier frequency and independently generating an intermediate carrier frequency,
    feedback means interconnecting said controlled oscillator to said local signal generating means and including modulation generating means for supplying a modulating signal to said local signal generating means identical to the modulation coding of said incoming signal,
    a mixer reciving said locally generated modulated signal and said incoming modulated signal to produce and supply a resultant intermediate frequency signal having an amplitude modulation component indicating any time of an occurrence differences in modulation components of said incoming signal and said locally generated signal with a null amplitude indicating no such time differences,
    band pass filter means tuned to said intermediate carrier frequency and connected to said mixer for passing the supplied amplitude modulated intermediate frequency carrier signal,
    a phase detector connected to said filter means and to said local signal generating means for receiving said intermediate frequency carrier signal which is in phase coherence with said intermediate frequency signal supplied to said mixer and the detector being operative to compare said signals for supplying a range indicated output signal and
    wherein said controlled oscillator receives output signals from said phase detector for adjusting its operation to the phase of incoming signal modulation components whereby the local signal generating means is adjusted such that the local signal modulation is in time coincidence with the incoming signal modulation.

2. The combination of claim 1 wherein said modulation is a pseudo-noise code having a correlation factor of two.

3. A system for indicating time differences of occurrence between modulation components of first and second signals, each signal having identical pseudo-noise modulation with a correlation factor of two and having identical modulation clock frequency signal components but different carrier frequency signal components, the improvement including in combination, a controllable oscillator operating at the modulation clock frequency, local signal generating means including pseudo-noise modulation means for supplying said first signal, input means supplying said second signal, a mixer receiving both said signals and jointly responsive thereto to supply a difference carrier frequency signal having a frequency equal to the difference frequency of said first and second signal carrier frequencies, and having an amplitude modulation portion indicative of any time differences between said first and second signals with a null amplitude indicating zero time differences, narrow band pass filter means tuned to said difference frequency for receiving such signal from the mixer and supplying a narrow band amplitude modulated difference frequency, a phase detector receiving the last mentioned signal and receiving said first signal from said local signal generating means and supplying a phase detected output signal to said controllable oscillator for adjusting its operation such that said difference frequency signal has a null amplitude.

References Cited

UNITED STATES PATENTS

| 3,128,465 | 4/1964 | Brilliant | 343—7.5 X |
| 3,173,138 | 3/1965 | Erst | 343—14 |
| 3,191,171 | 6/1965 | Zuefeldt et al. | 343—7.5 X |
| 3,197,773 | 7/1965 | Black et al. | 343—14 X |

RODNEY D. BENNETT, Primary Examiner

J. P. MORRIS, Assistant Examiner

U.S. Cl X.R.

324—83; 343—14